Patented Sept. 3, 1946

2,407,183

UNITED STATES PATENT OFFICE 2,407,183

RUBBER COMPOSITION

Frank J. Soday, Swarthmore, Pa., assignor to The United Gas Improvement Company, a corporation of Pennsylvania No Drawing. Application October 17, 1942, Serial No. 462,411

17 Claims. (Cl. 260—36)

This invention relates to new compositions of matter comprising natural and/or synthetic rubber and one or more esters of alkyl phenylethyl alcohol.

More particularly, this invention pertains to rubber compositions comprising a mixture of one or more natural and/or synthetic rubbers or elastomers, and one or more esters of alkyl phenylethyl alcohols, either alone or in combination with other softening and/or plasticizing agents.

An object of the invention is to provide natural and/or synthetic rubber compositions suitable for use as tire or tube stocks; for molding and extruding purposes, for the fabrication of printers' rolls, hose, sheets, tubes, gaskets, and other objects and specialties; for the preparation of adhesives and cements; and for coating, impregnating, waterproofing, and other specialized uses; comprising one or more natural and/or synthetic rubbers and/or elastomers and one or more esters of alkyl phenylethyl alcohols with or without the incorporation of other additives selected from a list comprising sulfur, accelerators, pigments, resins, antioxidants, fillers, extenders, and/or other plasticizing and/or softening agents, such as stearic acid, pine oil and pine tar. Another object of the invention is the use of esters of alkyl phenylethyl alcohol in conjunction with other ingredients, such as resins, resinous materials, plastic product, and dibutyl phthalate, tricresyl phosphate, or other high boiling compounds, as softening and/or plasticizing agents for natural and/or synthetic rubber. Other objects and advantages of the invention will be apparent to those familiar with the art upon an inspection of the specification and claims.

A considerable number of the softening and/or plasticizing agents employed in rubber compounds, and particularly synthetic rubber compounds, at the present time suffer from many disadvantages, among which is their lack of compatibility with natural and, more particularly, with synthetic rubber. This lack of compatibility renders it extremely difficult to obtain a uniform mixture or dispersion of the softener in the rubber compound, resulting in the production of non-uniform objects or products. In addition, the use of such softening agents frequently results in the leafing or lamination of the rubber compound during the mastication or calendering process. Finally, the incorporation of such incompatible softeners in rubber compounds results in the production of finished objects which frequently exhibit bleeding or blooming during use.

I have discovered that the esters of alkyl phenylethyl alcohol are unusually well adapted for use as softening agents for natural and/or synthetic rubber. Particularly desirable results are obtained when such esters are incorporated in synthetic rubber compositions.

The excellent results obtained when esters of the type described herein are used as plasticizing and/or softening agents for natural and/or synthetic rubber are largely due to the pronounced solubility characteristics of such esters, and their excellent compatibility with natural and/or synthetic rubbers and elastomers. This enables each mill to operate at maximum throughput, with a very substantial saving in power.

The use of such esters in natural and/or synthetic rubber compounding results in the production of uniform compounds and finished articles remarkably free from bleeding, blooming, leafing, or lamination.

In addition the low viscosity characteristics of esters of the type described greatly assists in the milling and blending operations, and insures rapid and complete penetration. Uniform stocks possessing good calendering and extruding characteristics are thus obtained.

Esters of the type described are quite stable and strongly resistant to thermal decomposition, thus insuring the production of uniform compounds and finished articles free from decomposition products. Such compounds, and the finished articles prepared therefrom, possess very good aging characteristics.

These esters also contain substantially no free carbon or other extraneous materials. This is of considerable importance from the standpoint of the preparation of clean, uniform rubber compounds and finished articles and from the standpoint of smooth, trouble-free mill operation.

By a choice of the proper compounding ingredients and reaction conditions, rubber compositions possessing almost any desired property may be obtained readily. Thus, products ranging from very soft, mildly cured types to the so-called hard rubbers may be obtained at will.

Esters of the type desired may be regarded as derivatives of alcohols having the following structural formula

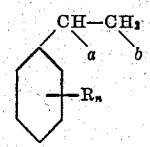

in which one of the group consisting of $a$ and $b$ is an hydroxyl group, the other being hydrogen, R is an alkyl group, and $n$ denotes that from one to five alkyl groups may be present in the molecule. Alcohols of this type are readily esterified with acids to give esters which are unusually stable, light in color, and possess exceptionally desirable odors.

Acids which may be reacted with alcohols of the type described include aliphatic monobasic acids, such as formic, acetic, propionic, butyric, valeric, caproic, oenanthic, caprylic, pelargonic, capric, and similar acids having a higher number of carbon atoms; unsaturated acids, such as acrylic acid, crotonic acid, isocrotonic acid, methacrylic acid, vinylacetic acid, and the like; halogenated fatty acids, such as chloroformic acid, monochloroacetic acid, dichloroacetic acid, alpha-chloropropionic acid, and the like; hydroxy acids, such as glycollic acid, lactic acid, alpha-hydroxy-butyric acid, and the like; amino acids, such as glycine, alanine, valine, leucine, and the like; dibasic acids, such as oxalic acid, malonic acid, methyl malonic acid, succinic acid, maleic acid, fumaric acid, and the like; aromatic carboxylic acids, such as benzoic acid, anthranilic acid, salicylic acid, phthalic acid, and the like; and aryl-substituted aliphatic acids, such as phenylacetic acid, hydrocinnamic acid, phenyl propionic acid, cinnamic acid, and the like.

Such esters may be regarded as having the following structural formula

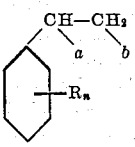

in which one of the group consisting of $a$ and $b$ is an —OOC—X group, in which X is hydrogen, alkyl, alkenyl, substituted alkyl, substituted alkenyl, aryl, substituted aryl, alkyl-aryl, substituted alkyl-aryl, aryl-alkyl, substituted aryl-alkyl, the

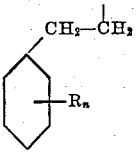

group, or the

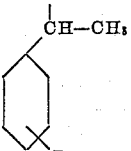

group, the other of said group consisting of $a$ and $b$ being hydrogen, R is an alkyl group, and $n$ denotes that from one to five alkyl groups may be present in the molecule.

Esters of tolylethyl alcohols,

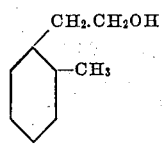
beta ortho tolylethyl alcohol

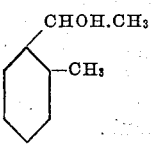
alpha ortho tolylethyl alcohol,

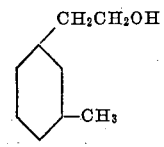
beta meta tolylethyl alcohol

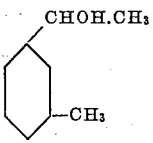
alpha meta tolylethyl alcohol and

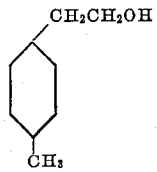
beta para tolylethyl alcohol

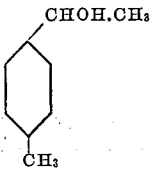
alpha para tolylethyl alcohol are particularly desirable plasticizing agents for resinous and plastic materials.

The preparation of alpha tolylethyl alcohol is disclosed and claimed in my U. S. Patent 2,293,744, dated Aug. 25, 1942.

The preparation of the acetic, propionic, butyric, and valeric acid esters of tolylethyl alcohols are disclosed and claimed in my copending applications, Serial Nos. 313,342, filed January 11, 1940, now Patent 2,316,912, dated April 20, 1943; and in my U. S. Patent 2,293,775, dated August 25, 1942.

Such esters may be prepared by the reaction of the desired tolylethyl alcohol, or mixtures of tolylethyl alcohols, or derivatives of tolylethyl alcohols containing an atom or group capable of being replaced with an ester group corresponding to the desired acid or mixture of acids, with the desired acid or anhydride, or salts or derivatives thereof.

The preparation of such esters may be illustrated by the preparation of the valeric acid esters of tolylethyl alcohols.

Valeric acid occurs in four isomeric forms, as follows.

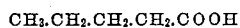
n-valeric acid

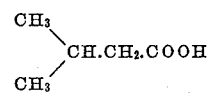
isovaleric acid

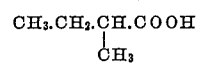
active valeric acid

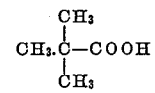
pivalic acid

The conversion of tolylethyl derivatives to tolylethyl esters of valeric acids may be carried out in any suitable manner, and with any suitable esterification apparatus.

Any suitable esterification reagent, such as a valeric acid, its anhydride, its salt or mixtures thereof, may be employed as desired.

For example, valeric acid or acid halides thereof may be employed for the conversion of tolylethyl alcohols or metallic derivatives thereof to valerates, and salts of valeric acid may be used for the conversion of tolylethyl halides to valerates.

Illustrative of the salts of valeric acid which may be employed as esterification reagents may be mentioned sodium valerate, potassium valerate, calcium valerate, iron valerate, lead valerate and other salts. These salts may be the normal valerates, or the isomeric valerates, or any desired mixture thereof.

The esterification reaction may be carried out in the presence of a solvent, such as for example, benzene, if desired.

Any suitable reaction temperature may be employed, such as for example, the boiling point of the solution.

The esterification reaction may be carried out at atmospheric, subatmospheric, or superatmospheric pressures, as desired.

Suitable esterification catalysts, such as, for example, sulfuric acid, phosphoric acid or anhydrous hydrogen chloride, may be advantageously employed in certain of the reactions, particularly in the conversion of tolylethyl alcohols to esters of valeric acids.

The use of a system whereby any water formed by the esterification reaction can be continuously removed from the system will, in general, be found advantageous from the standpoint of the yield of ester secured, as well as from the standpoint of the considerable reduction in time necessary to complete the reaction.

One suitable method for effecting the esterification processes of the present invention comprises refluxing the derivatives with esterification reagents for a period of several hours.

For example, salts of valeric acids may be refluxed with tolylethyl halides to produce the corresponding tolylethyl esters. This reaction may, if desired, be effected in the presence of the corresponding valeric acid.

The tolylethyl esters thus produced may be suitably separated from the halogen salts in the reaction mixture, for example, by filtration.

If a valeric acid has been employed in the esterification reaction, it may be removed such as by distillation under reduced pressure. Any unremoved acid may then be neutralized such as with an alkaline solution.

The tolylethyl esters obtained by the processes herein described may be isolated and purified in any desired manner.

For example, the reaction mixture may, if desired, be repeatedly extracted with any suitable solvent, such as ether or benzene, to increase the yield and purity of the tolylethyl esters therein.

The extracts may then be combined and dried over a drying agent such as, for example, anhydrous sodium sulfate, after which the extraction solvent employed may be removed by distillation at atmospheric pressure. The residue may then be fractionally distilled in vacuo to obtain a purified tolylethyl ester of valeric acid.

Mixtures of alpha and beta tolylethyl derivatives, in any proportion, may be employed in the preparation of mixtures of alpha and beta tolylethyl esters of valeric acids.

Such mixtures of the alpha and beta forms of para tolylethyl esters of valeric acids may be desired in order to obtain a product possessing a desired boiling range, or desired volatility characteristics, or other desired properties.

For example, a mixture containing the desired proportion of each of the isomeric forms of tolylethyl halides may be reacted with a salt of valeric acid to obtain a tolylethyl ester fraction containing the desired proportion of the isomeric forms of tolylethyl esters of the acid. Mixtures containing the desired proportion of alpha and beta tolylethyl halides suitable for use in my process may be obtained, for example, by adding a hydrogen halide to methyl styrene under the proper conditions to give the desired mixture of isomeric tolylethyl halides.

Similarly, a mixture of the isomeric forms of other tolylethyl derivatives, such as for example the tolylethyl alcohols, in the desired proportions, may be esterified to obtain a tolylethyl ester fraction containing the desired proportion of the isomeric forms of tolylethyl esters of valeric acid. Also a mixture of valeric acids or anhydrides, or derivatives thereof, may be employed in the foregoing processes.

When mixtures of isomeric forms of tolylethyl esters of valeric acid are obtained, they may if desired be separated into fractions containing the individual isomers by any suitable method, such as for instance by fractionation.

As illustrative of the methods for preparing various tolylethyl esters of valeric acids, the following examples are given:

*Example 1*

A 108 gram (0.7 mole) portion of alpha, para-tolylethyl chloride:

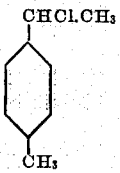

was added with stirring to a mixture of 127 grams (0.91 mole) of freshly prepared potassium n-valerate in 100 grams of n-valeric acid, the addition being carried out in a 1-liter flask fitted with a reflux condenser. The mixture was heated to 140° C. by means of an oil-bath and maintained at this temperature with good stirring for a period of five hours. It was allowed to cool and then treated with 10% sodium bicarbonate solution to neutralize the unchanged valeric acid present. The neutral mixture was then extracted with ether and dried over anhydrous sodium sulphate.

After the ether had been removed by heating on a hot water bath, the ester was distilled in vacuo, giving 110 grams of alpha, para-tolylethyl n-valerate.

This compound had the following structural formula and physical properties:

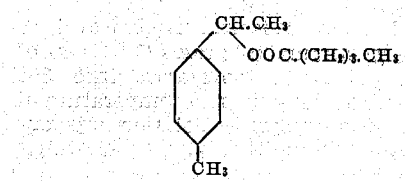

Boiling range=126–127° at 6 mm. Hg absolute
Density ($d$ 20/4) =0.9697
Refractive index ($n$ 20/$d$) =1.48805

The yield was 71.4% of theoretical.

The compound was a colorless, somewhat viscous liquid with a very pleasant odor.

*Example II*

A solution of potassium n-valerate in n-valeric acid was made by stirring 210 grams (1.5 mols) of the fused salt into 250 grams of the anhydrous acid heated to 100° C. When a clear syrupy solution was obtained, 199 grams (1 mol) of beta, para-tolylethyl bromide:

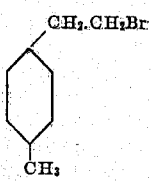

was added slowly through the reflux condenser and the temperature was raised gradually to 170°. This temperature was maintained for a period of 13 hours, during which time a fine precipitate of potassium bromide separated from the reaction mixture.

The mixture was cooled and filtered by suction to remove the potassium bromide and excess potassium valerate, and the clear filtrate was distilled under reduced pressure to remove the major portion of the valeric acid which came over at a temperature of 50–60° at 4 mm. pressure absolute. The potassium bromide and excess potassium valerate were dissolved in cold water and extracted twice with ether to recover the small amount of absorbed ester. This extract was combined with the crude ester and treated with 10% sodium bicarbonate solution to neutralize the residual acid. It was then extracted with ether, dried with anhydrous sodium sulphate, and distilled.

Distillation under reduced pressure gave 172 grams of beta, para-tolylethyl n-valerate:

This compound had the following physical properties:

Boiling range = 113–116° at 4 mm. Hg absolute
Density ($d\ 20/4$) = 0.9720
Refractive index ($n\ 20/d$) = 1.48855

This represented a yield conversion of 78.2%, based on the amount of beta, para-tolylethyl bromide used in the esterification.

The ester was obtained as a colorless, somewhat viscous liquid with an agreeable odor.

*Example III*

A solution of potassium isovalerate in isovaleric acid was made by stirring 210 grams (1.5 mols) of freshly fused potassium isovalerate into 300 grams of the anhydrous acid at a temperature of 90° C. When a clear syrupy solution was obtained, 155 grams (1 mol) of alpha para-tolylethyl chloride:

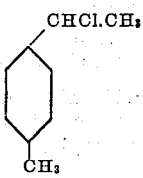

was added slowly through the reflux condenser, and the temperature was raised gradually to 140° C. The temperature was kept at 140–145° for five hours with vigorous stirring, during which time a fine precipitate of potassium chloride separated out as a by-product of the reaction. The mixture was cooled and filtered by suction to remove the potassium chloride and excess potassium isovalerate, and the clear filtrate was distilled under reduced pressure to remove most of the isovaleric acid. The higher boiling liquid containing the ester was treated in the cold with 10% sodium bicarbonate solution to neutralize the residual acid. It was then extracted with ether, dried and distilled.

Distillation under reduced pressure gave 166 grams of alpha, para-tolylethyl isovalerate:

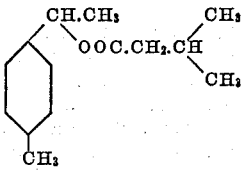

This compound had the following physical properties:

Boiling range = 127–132° at 7 mm. Hg absolute
Density ($d\ 20/4$) = 0.9642
Refractive index ($n\ 20/d$) = 1.48532

The yield was 75.5% based on the weight of alpha, para-tolylethyl chloride used.

This product was a colorless, somewhat viscous liquid with an agreeable ester odor.

*Example IV*

A 210 gram portion (1.5 mols) of potassium isovalerate was added with stirring to 250 grams of isovaleric acid and heated to 100° C. until all the salt was dissolved. To this clear, syrupy solution was added dropwise, with continued stirring, 200 grams (1 mol) of beta, para-tolylethyl bromide:

in 50 minutes after which the temperature was raised to 165°. The temperature was kept at 163–167°, producing mild refluxing of the acid, for a period of 14 hours. The reaction mixture was then cooled and filtered to remove the potassium bromide and excess potassium isovalerate, and this solid matter was dissolved in water and extracted with ether to recover any absorbed ester. The clear filtrate was distilled to remove most of the isovaleric acid which came over at 49–51° at 3 mm. Hg absolute. The crude ester, combined with the ether extract, was treated with 10% sodium bicarbonate solution to neutralize the residual acid. It was then extracted with ether, dried with anhydrous sodium sulphate and distilled.

Distillation under reduced pressure gave 156 grams of beta, para-tolylethyl isovalerate:

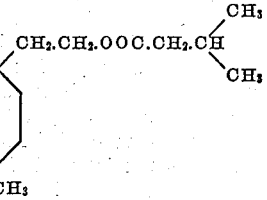

This compound had the following physical properties:

Boiling range = 99–104.5° at 1 mm. Hg absolute
Density ($d20/4$) = 0.9645
Refractive index ($n20/d$) = 1.48527

This weight of product represented a yield of 73.4%, based on the weight of beta, para-tolylethyl bromide used in the esterification.

The ester was obtained as a colorless, somewhat viscous liquid with a very sweet odor.

It will be understood, of course, that tolylethyl esters of valeric acids may be prepared from pure methyl styrene or hydrocarbon fractions such as light oil fractions containing methyl styrene by processes which may be conducted on a continual, continuous, semi-continuous, or batch basis. For example, such a process may comprise first converting the methyl styrene into a tolylethyl derivative containing a substituent capable of being replaced with an ester group corresponding to the desired valeric acid, and thereafter effecting esterification of said derivative.

For example, a tolylethyl halide or a mixture of tolylethyl halides may be prepared from a light oil methyl styrene fraction obtained by the distillation of light oil from oil gas and containing meta, para and ortho methyl styrenes and these tolylethyl halides may then be esterified to form the desired tolylethyl esters of valeric acid.

Likewise, a mixture of tolylethyl alcohols may be prepared from such a methyl styrene fraction, after which the tolylethyl alcohols may be converted into tolylethyl esters of valeric acid by esterification.

The use of fatty acid or mixed fatty acid esters of a mixture of m-, p- and o-tolylethyl alcohols as a plasticizing agent or agents for natural, and more particularly synthetic, rubber is a preferred embodiment of this invention.

Examples of the rubber or rubber-like materials with which esters of the type described herein may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, Buna, Buna S, Buna N, Perbunan, Chloroprene, Neoprene, Ameripol, Hycar, Butyl rubber, and the like.

The quantity of esters of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

In addition to esters of the type described herein, other ingredients which may be incorporated in natural rubber and/or synthetic rubber compositions include vulcanizing agents and/or accelerators, such as, for example, sulfur or sulfur-containing compounds such as tetramethylthiuram disulfide mercaptoarylenethiazoles, such as mercaptobenzothiazole, benzothiazyl disulfide, litharge, and dithio carbamates; pigments, such as, for example, magnesium oxide, zinc oxide, and lead oxide; antioxidants, such as, for example phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutyl phthalate, tricresyl phosphate, pine oil, oils, fatty acids, and synthetic or natural resins or resinous materials.

A preferred embodiment of the invention is the use of esters of the type described in conjunction with resins, such as those derived by the polymerization of light oil and/or coal tar fractions containing coumarone and/or indene or the resins derived by the polymerization of the high-boiling monomeric material derived from tar by flash distillation and/or solvent extraction processes, and/or other organic liquids, such as the high-boiling aromatic oils derived by the flash distillation and/or solvent extraction of tar, as softening agents for natural and/or synthetic rubber.

A preferred embodiment of this invention is the use of an aromatic oil of the type described in combination with one or more resinous materials and an ester of the type described as a softener for natural and/or synthetic rubber compositions. A preferred resin for incorporating with the ester and aromatic oil is the resin obtained by the polymerization, by thermal and/or catalytic methods, of certain high-boiling monomeric material separated in monomeric form from tar formed during the production of combustible gas by processes involving the pyrolytic decomposition of petroleum oil with or without the aid of catalysts. Such resins may be formed in situ in aromatic oils of the type described herein.

Another desired resin which may be incorporated in the ester as a softener for natural and/or synthetic rubber is the resin derived by the polymerization of petroleum and/or coal tar fractions containing indene and/or coumarone.

Other desirable ingredients which may be blended with an ester of the type described either alone or in combination with one or more resinous materials and/or aromatic oils, as a softener for natural and/or synthetic rubber include the dimers of petroleum or coal tar fractions containing indene and/or coumarone, dibutyl phthalate, tricresyl phosphate, and pine oil.

Reclaimed rubber is also included among the materials which may be plasticized with the esters herein described, together with natural and/or synthetic rubber, and with or without other ingredients.

The ester or esters, and other ingredients, may be mixed or compounded with the natural rubber and/or synthetic rubber on mixing or compounding rolls or mills, or they may be compounded by any other method known in the art. The rubber composition then may be vulcanized, if desired, by any of the methods employed for this purpose in the art.

Examples of rubber compositions containing esters of the type described herein are as follows:

*Example 5*

| Component | Parts by weight |
| --- | --- |
| Natural rubber | 100 |
| Butyric acid esters of a mixture of o-, m-, and p-tolylethyl alcohols | 10 |
| Zinc | 5 |
| Sulfur | 2.5 |
| Mercaptobenzothiazole | 0.8 |

Example 6

| Component | Parts by weight |
|---|---|
| Pale crepe rubber | 100 |
| Zinc oxide | 45 |
| Sulfur | 2.5 |
| Resin obtained from monomeric material boiling above 210° C. and isolated from petroleum tar | 5 |
| Butyric acid esters of a mixture of o-, m-, and p-tolylethyl alcohols | 5 |
| Mercaptobenzothiazole | 0.6 |
| Stearic acid | 2 |

Example 7

A natural rubber tire tread mix may be compounded as follows:

| Component | Parts by weight |
|---|---|
| Smoked sheet rubber | 100 |
| Channel black | 40 |
| Zinc oxide | 6 |
| Valeric acid esters of a mixture of o-, m-, and p-tolylethyl alcohols | 2 |
| Resin obtained from monomeric material boiling above 210° C. and isolated from petroleum tar | 2 |
| Sulfur | 3 |
| Stearic acid | 2 |
| Mercaptobenzothiazole | 0.7 |

Example 8

A synthetic rubber tire tread mix may be compounded as follows:

| Component | Parts by weight |
|---|---|
| Neoprene | 100 |
| Zinc oxide | 5 |
| Mercaptobenzothiazole | 1.25 |
| Channel black | 45 |
| Valeric acid ester of tolylethyl alcohol | 4 |
| Phenyl-alpha-naphthylamine | 2 |
| Sulfur | 1.25 |

Example 9

| Component | Parts by weight |
|---|---|
| Buna S | 80 |
| Plantation crepe | 20 |
| Zinc oxide | 5 |
| Channel black | 50 |
| Age Rite resin D | 2 |
| Pine tar | 4 |
| Valeric acid ester of phenylethyl alcohol | 3 |
| Stearic acid | 2 |
| Sulfur | 1½ |
| Altax | 2 |

Example 10

| Component | Parts by weight |
|---|---|
| Butadiene-styrene rubber | 100 |
| Butyric acid ester of tolylethyl alcohol | 3 |
| Resin obtained from monomeric material boiling above 210° C. and isolated from petroleum tar | 3 |
| Carbon black | 40 |
| Sulfur | 1.25 |
| Mercaptobenzothiazole | 1.25 |
| Zinc oxide | 5 |
| Phenyl-alpha-naphthylamine | 1 |

Example 11

| Component | Parts by weight |
|---|---|
| Butadiene-acrylic nitrile rubber | 100 |
| Valeric acid ester of tolylethyl alcohol | 2 |
| Resin obtained from monomeric material boiling above 210° C. and isolated from petroleum tar | 3 |
| Carbon black | 30 |
| Sulfur | 1.5 |
| Mercaptobenzothiazole | 1.5 |
| Zinc oxide | 15 |
| Phenyl-alpha-naphthylamine | 2 |

Example 12

| Component | Parts by weight |
|---|---|
| Butadiene-isobutylene rubber | 100 |
| Butyric acid ester of tolylethyl alcohol | 5 |
| Resin obtained from monomeric material boiling above 210° C. and isolated from petroleum tar | 5 |
| Carbon black | 15 |
| Sulfur | 1.25 |
| Mercaptobenzothiazole | 1.25 |
| Phenyl-alpha-naphthylamine | 1 |
| Zinc oxide | 20 |

Example 13

| Component | Parts by weight |
|---|---|
| Perbunan | 100 |
| Zinc oxide | 5 |
| Benzothiazyl disulfide | 1½ |
| Sulfur | 1½ |
| Phenyl-beta-naphthylamine | 1 |
| Channel black | 50 |
| Stearic acid | 1 |
| Valeric acid ester of tolylethyl alcohol | 50 |

The foregoing compositions may be sheeted out, shaped and vulcanized, if desired, such as by the application of a temperature of, say, 140° C. in a press for a period of, say, 45 minutes. Other procedures may, of course, be used if desired.

Rubber-ester compositions of the type described, either as such or with the incorporation of other ingredients such as the resin and/or aromatic oil derived from monomeric material boiling above 210° C. and isolated from petroleum tar, may be used for a variety of purposes, such as for the manufacture of tires, tubes, and other objects, and as adhesives, coating, impregnating, and waterproofing agents. Such compositions may or may not be vulcanized prior to, during, or subsequent to the use thereof.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention.

I claim:

1. A new composition of matter comprising an ester of alkyl phenyl ethyl alcohol in which said alkyl substituent appears on the ring, and rubber selected from the group consisting of natural rubber and rubber-like polymers of butadiene, isoprene, piperylene, and 2-chlorobutadiene.

2. A new composition of matter comprising a vulcanized mixture of an ester of alkyl phenyl ethyl alcohol in which said alkyl substituent appears on the ring and rubber selected from the group consisting of natural rubber and rubber-like polymers of butadiene, isoprene, piperylene, and 2-chlorobutadiene.

3. A new composition of matter comprising an ester of tolyl ethyl alcohol, and rubber selected from the group consisting of natural rubber and rubber-like polymers of butadiene, isoprene, piperylene, and 2-chlorobutadiene.

4. A new composition of matter comprising a vulcanized mixture of an ester of tolyl ethyl alcohol, and rubber selected from the group consisting of natural rubber and rubber-like polymers of butadiene, isoprene, piperylene, and 2-chlorobutadiene.

5. A new composition of matter comprising at least one fatty acid ester of tolyl ethyl alcohol, and rubber selected from the group consisting of natural rubber and rubber-like polymers of butadiene, isoprene, piperylene, and 2-chlorobutadiene.

6. A new compostion of matter comprising a vulcanized mixture of at least one fatty acid ester of tolyl ethyl alcohol, and rubber selected from the group consisting of natural rubber and rubber-like polymers of butadiene, isoprene, piperylene, and 2-chlorobutadiene.

7. A new composition of matter comprising a vulcanized mixture of a propionic acid ester of tolyl ethyl alcohol, and rubber selected from the group consisting of natural rubber and rubber-like polymers of butadiene, isoprene, piperylene, and 2-chlorobutadiene.

8. A new composition of matter comprising a vulcanized mixture of a butyric acid ester of tolyl ethyl alcohol, and rubber selected from the group consisting of natural rubber and rubber-like polymers of butadiene, isoprene, piperylene, and 2-chlorobutadiene.

9. A new composition of matter comprising a vulcanized mixture of a valeric acid ester of tolyl ethyl alcohol, and rubber selected from the group consisting of natural rubber and rubber-like polymers of butadiene, isoprene, piperylene, and 2-chlorobutadiene.

10. A new composition of matter comprising the vulcanizate of a mixture comprising butadiene-styrene copolymer rubber and an ester of alkyl phenyl ethyl alcohol in which said alkyl substituent appears on the ring.

11. A new composition of matter comprising the vulcanizate of a mixture which comprises butadiene-isobutylene copolymer rubber and an ester of alkyl phenyl ethyl alcohol in which said alkyl substituent appears on the ring.

12. A new composition of matter comprising a vulcanizate of a mixture containing butadiene-acrylic nitrile copolymer rubber and an ester of alkyl phenyl ethyl alcohol in which said alkyl substituent appears on the ring.

13. A new composition of matter comprising a vulcanized mixture of butadiene-styrene copolymer rubber, and a fatty acid ester of tolyl ethyl alcohol.

14. A new composition of matter comprising vulcanized material selected from the group consisting of natural rubber and rubber-like polymers of butadiene, isoprene, piperylene, and 2-chlorobutadiene, said vulcanized material being plasticized with a fatty acid ester of tolyl ethyl alcohol.

15. A new composition of matter comprising a vulcanized mixture of butadiene-styrene copolymer rubber, and propionic acid ester of tolyl ethyl alcohol.

16. A new composition of matter comprising a vulcanized mixture of butadiene-isobutylene copolymer rubber, and butyric acid ester of tolyl ethyl alcohol.

17. A new composition of matter comprising a vulcanized mixture of butadiene-acrylic nitrile copolymer rubber, and valeric acid ester of tolyl ethyl alcohol.

FRANK J. SODAY.